(12) United States Patent
Kontis et al.

(10) Patent No.: US 9,011,103 B2
(45) Date of Patent: Apr. 21, 2015

(54) ROTOR BLADE OF A WIND POWER PLANT, METHOD OF FABRICATING A ROTOR BLADE AND A PAIR OF BELTS FOR A ROTOR BLADE

(75) Inventors: Mario Kontis, Kiel (DE); Jens Kulenkampff, Kiel (DE)

(73) Assignee: Senvion SE, Hamburg (DE)

( * ) Notice: Subject to any disclaimer, the term of this patent is extended or adjusted under 35 U.S.C. 154(b) by 605 days.

(21) Appl. No.: 13/382,324

(22) PCT Filed: Jun. 15, 2010

(86) PCT No.: PCT/EP2010/003584
§ 371 (c)(1),
(2), (4) Date: Jan. 5, 2012

(87) PCT Pub. No.: WO2011/006562
PCT Pub. Date: Jan. 20, 2011

(65) Prior Publication Data
US 2012/0107128 A1 May 3, 2012

(30) Foreign Application Priority Data
Jul. 13, 2009 (DE) .......................... 10 2009 033 165

(51) Int. Cl.
| F03D 1/06 | (2006.01) |
| B29C 65/00 | (2006.01) |
| B29C 65/48 | (2006.01) |
| B29C 65/78 | (2006.01) |
| B29D 99/00 | (2010.01) |
| B29K 63/00 | (2006.01) |
| B29K 307/00 | (2006.01) |
| B29K 309/08 | (2006.01) |
| B29L 31/08 | (2006.01) |

(52) U.S. Cl.
CPC ............... *B29C 66/244* (2013.01); *B29C 65/48* (2013.01); *B29C 65/7841* (2013.01); *B29C 66/1142* (2013.01); *B29C 66/54* (2013.01); *B29C 66/721* (2013.01); *B29D 99/0028* (2013.01); *B29K 2063/00* (2013.01); *B29K 2277/10* (2013.01); *B29K 2307/00* (2013.01); *B29K 2309/08* (2013.01); *B29L 2031/082* (2013.01); *B29L 2031/085* (2013.01); *F03D 1/0675* (2013.01); *Y02E 10/721* (2013.01); *B29C 66/543* (2013.01)

(58) Field of Classification Search
CPC ..................................................... F03D 1/0675
USPC .......... 416/224, 226, 229 R, 230, 212 R, 225, 416/233, 228
See application file for complete search history.

(56) References Cited

U.S. PATENT DOCUMENTS

| 4,732,542 A | 3/1988 | Hahn et al. | |
| 7,334,989 B2 * | 2/2008 | Arelt ................................ | 416/2 |

(Continued)

FOREIGN PATENT DOCUMENTS

| DE | 3113079 | 4/1981 |
| DE | 102008038620 | 12/2009 |
| DE | 102008045578 | 12/2009 |
| EP | 1965074 | 9/2008 |

(Continued)

*Primary Examiner* — Dwayne J White
*Assistant Examiner* — Justin Seabe
(74) *Attorney, Agent, or Firm* — Rankin, Hill & Clark LLP

(57) ABSTRACT

The invention relates to a rotor blade (10) of a wind power plant and a method for fabricating a rotor blade (10) of a wind power plant and a manufacturing mold (54, 50) for a belt (28-31). The invention is characterized by a belt pair (28, 29, 30, 31) in which two belts (28, 29, 30, 31) are connected together in a form-fit and/or force-fit and material fit connection, where the belts (28-31) have a complementary shape in a joining area (50).

6 Claims, 6 Drawing Sheets

(56) References Cited

U.S. PATENT DOCUMENTS

| | | |
|---|---|---|
| 8,167,569 B2 * | 5/2012 | Livingston .................... 416/224 |
| 2009/0070977 A1 | 3/2009 | Livingston et al. |
| 2009/0162208 A1 | 6/2009 | Zirin et al. |

FOREIGN PATENT DOCUMENTS

| | | |
|---|---|---|
| WO | 01/46582 | 6/2001 |
| WO | 03/093672 | 11/2003 |
| WO | 2009/156105 | 12/2009 |

* cited by examiner

ROTOR BLADE OF A WIND POWER PLANT, METHOD OF FABRICATING A ROTOR BLADE AND A PAIR OF BELTS FOR A ROTOR BLADE

BACKGROUND OF THE INVENTION

1. Field of the Invention

The invention relates to a rotor blade for a wind power plant, where the rotor blade has a longitudinal extension, which extends from a rotor blade root substantially to a rotor blade tip, where an aerodynamic airfoil cross-section is provided at least in one area of the rotor blade that has an airfoil leading edge (nose) and an airfoil trailing edge, which are connected via a suction side and a pressure side of the airfoil cross-section.

The invention further relates to a method for manufacturing a corresponding rotor blade. Furthermore, the invention relates to a pair of belts for use in a rotor blade and a method for fabricating a rotor blade and an arrangement of a manufacturing mold for producing a pair of belts for use in a rotor blade with an intermediate web.

2. Description of Related Art

Rotor blades for wind power plants are typically constructed in two shells, namely a shell on the suction side of the rotor blade and a shell on the pressure side of the rotor blade, and are bonded together. Between the shells, there are at least two webs or beams that are bonded on the belt for the suction side and the belt for the pressure side, and that ensure against bulging in the blade. The belts ensure in particular torsional or flexural rigidity of the rotor blade, and in combination with the webs or respectively beams represent the support structure of the rotor blade.

With large rotor blades in particular, the production of the rotor blades is time consuming and costly. For this reason, such large rotor blades are produced in a plurality of parts rather than only two shells, and are then bonded. Because of this, the individual parts are smaller, whereby the fabrication time and the costs due to possible fabrication errors are reduced. In particular, the documents DE 31 13 079 A1 and EP 1 965 074 A2 are referred to for this purpose.

In addition, reference is made to WO 03/093672 A1, which discloses a rotor blade for wind power plants with a shell whose airfoil cross section is reinforced against bending in the flapwise direction by belts lying pairwise across from each other with respect to the airfoil chord of the rotor blade, and by webs between these, where the belts are comprised of plastic that is fiber reinforced in the longitudinal direction, and in the longitudinal direction have a glass fiber reinforced section and a carbon fiber reinforced section.

BRIEF SUMMARY OF THE INVENTION

The object of the present invention is to specify a rotor blade and a belt pair that can be fabricated simply, precisely and cost-effectively, a corresponding method for fabricating the rotor blade, and a corresponding arrangement of a manufacturing mold for producing a belt pair for use in a corresponding rotor blade with an intermediate web.

This objective is solved by a rotor blade of a wind power plant, where the rotor blade has a longitudinal extension that extends substantially from a rotor blade root to a rotor blade tip, where an aerodynamic airfoil cross section is provided at least in one area of the rotor blade that has an airfoil leading edge (nose) and an airfoil trailing edge which are connected together via a suction side and a pressure side of the airfoil cross section, that is further developed in that at least in one longitudinal extension the rotor blade is divided into a front rotor blade section with an airfoil leading edge and a rear rotor blade section with an airfoil trailing edge, where the rear area of the front rotor blade section and the adjacent front area of the rear rotor blade section are connected by at least two belts, which in a joining area that runs in the longitudinal extension of the rotor blade have a form-fit and/or force-fit and material fit connection.

Preferably, a belt, within the framework of the invention, is an important load-bearing element of a rotor blade, which is designed to receive impact forces, torques and/or bending forces. A belt is, in particular, a fiber-glass-reinforced plastic fabric, which with several layers, in particular made of fiber-glass mats, alone or in combination with other aramid fiber mats or carbon fiber mats, that in connection to a polyester resin, or an epoxy resin for example, leads to a corresponding stability. The thickness of the belt depends on the blade length and the load parameters calculated for one position. The thickness can be in the range of 2 cm to 10 cm. Correspondingly, the width of a belt is in the range of 5 cm to 50 cm. Two belts, which together from a belt pair, can then have a width of up to 1 m.

The solution of the invention can preferably be combined with a further invention, which was submitted in a parallel patent application to the German Patent and Trademark Office on the same day as the present patent application, with the title "Rotorblatt einer Windenergieanlage sowie Verfahren zum Fertigen eines Rotorblatts einer Windenergieanlage". For this purpose, the rotor blade is divided at least in one longitudinal section into a front rotor blade section with the airfoil leading edge and a rear rotor blade section with the airfoil trailing edge, where the rear area of the front rotor blade section and the adjacent front area of the rear rotor blade section are connected via an I-beam.

By providing an I-beam, which particularly in the scope of the invention can also be designated as a double-T-beam, it is possible to produce a corresponding rotor blade very efficiently and cost-effectively. In doing so, the rotor blade can be pre-fabricated in two halves and the connection contributes to high stability, in particular the bonding of webs that abut each other, which extend from a suction side to a pressure side and which are connected in particular to the respective belts to form an I-beam. In this context, it was surprising to observe that a component that contributes to the stability or respectively stiffness of the rotor blade and has a bearing function as an essential component, can start off being divided and by an appropriate connection of the parts of the bearing structure, particularly by bonding, still generate sufficient stability or respectively preferably even an increased stability.

The longitudinal extension, which extends substantially from a rotor blade root to a rotor blade tip, means in particular that the longitudinal extension does not necessarily have to extend exactly to the rotor blade tip, it can also be disposed offset at an angle so that the longitudinal extension from the rotor blade root lies at an angle to a longitudinal extension that does go to the rotor blade tip. The angle here can lie between −5° and 5° for example. The angle can also be so large that for a rotor blade fabrication, in which a pre-fabricated rotor blade tip having an extent of up to 5 m in the longitudinal direction is applied to the remaining partial blade, the longitudinal extension for the trailing edge or leading edge can lie at the join location for the joining edge of the partial blade to the rotor blade tip. It is particularly preferable if there is a shift of 200 mm to 300 mm toward the leading edge or trailing edge of the rotor blade in the longitudinal extension from the rotor blade root to the rotor blade tip, so that a corresponding angle of the longitudinal extension is given to an imaginary longitudinal extension from the rotor blade root to the rotor blade tip.

Preferably, the I-beam has a web which extends within the rotor blade from the pressure side to the suction side, and also has a belt at the pressure side as well as a belt at the suction side. In this context, the belt is preferably arranged within the rotor blade and connected to an exterior shell.

The web preferably comprises web feet that form a shape of a square bracket or the shape of a Z together with the web.

A particularly simple and efficient fabrication is given if the I-beam is divided in the longitudinal extension. The I-beam parts are preferably connected together, in particular bonded together. The I-beam preferably has I-beam parts that comprise a web, where the I-beam is divided in the longitudinal extension and in a plane, in particular in a plane that is defined by the web. The I-beam in this context is substantially a flat component, where the plane of the division extends centrally through the web, and in particular substantially in parallel to the side surfaces. Due to the bonding which can take place also with the aid of glass fibers, and for example can be performed with a plastic technology using at least one resin and at least one fiber layer, in particular glass fiber and/or carbon fibers, and/or aramid fibers, a bonding can be performed using, for example, an injection pressing technique, an infusion technique or a vacuum-supported infusion technique.

If two belts, which cap off the I-beam in each case for the suction side and for the pressure side, have a separation distance from each other that is less than the extension of the belts in the direction from the airfoil leading edge to the airfoil trailing edge of the rotor blade, then a particularly stable construction of the rotor blade is possible, where in this context, the separation distance of the belts is filled with a binding means, such as a bonding made of a resin for instance.

The distanced belts on the suction side and/or on the pressure side are each preferably connected to a web foot of a web by bonding. The web foot then has a corresponding extension in the cord direction between the airfoil leading edge and the airfoil trailing edge or respectively a nearly tangential extension to the airfoil in the area of the web, which permits a sufficiently firm and stable connection of the belts on both the pressure side as well as the suction side.

The rotor blade is preferably additionally divided during production at the airfoil leading edge and/or at the airfoil trailing edge. This results in an even simpler and more exact fabrication possibility for the rotor blade. For an appropriate fabrication method and manufacturing mold to make this possible, reference is made to the full content of the patent application of Aug. 12, 2008 from the applicant, entitled "Verfahren and Fertigungsform zur Fertigung eines Rotorblatts für eine Windenergieanlage" with file number DE 10 2008 038 620.0.

The rotor blade according to the invention is preferably further developed in that two belts at the suction side and two belts at the pressure side of the rotor blade are connected together in a form-fit and/or force-fit and material fit connection. In this case, the connection is preferably along a joining surface or an abutting edge or a joining area in the longitudinal extension of the rotor blade. In the scope of the invention, the term joining surface and the terms joining edge, abutting surface, abutting edge comprise surfaces adjoining each other or surfaces across from each other that are or will be connected together.

Preferably, at least one web connects two belts together in each case, where the connection is correspondingly between the suction side and the pressure side of the rotor blade.

The belts in the joining area have areas that overlap transverse to the longitudinal extension of the rotor blade. This is understood to mean in particular that a belt, which is disposed near another belt, overlaps the other belt or respectively that the two belts engage in each other.

In the context of the invention, the term joining area is in particular understood to mean an abutting edge, a contact edge, a contact area, a contact surface or respectively abutting surface.

In the joining area, the belts are preferably designed with complimentary shapes, in particular in the form of a dovetail, the form of a bevel or with a bevel, with a tongue and groove and/or stepped. This results in a larger joining connection surface, joining surface or a larger joining edge compared to a joining surface of the belts that is perpendicular to the longitudinal extension, so that a more stable connection results between the belts.

An overlapping element that reaches beyond at least one part of the belts transverse to the longitudinal extension, is preferably provided in the joining area. The overlapping element can be considered as a belt or as a belt connector. The overlapping element is then correspondingly connected to the belt, using a bond connection for example.

The overlapping element is preferably flush with a surface of the joined belts or respectively the outer shell of the rotor blade, where the surface is disposed transverse to the abutting edge or to the joining edge of the belts and transverse to the longitudinal extension. As a result, the aerodynamics of the rotor blade are not disrupted by the edges at the surface of the rotor blade. Preferably, one of the two belts is connected to the front rotor blade section, and the other of the two belts is connected to the rear rotor blade section.

The object is further solved by a belt pair for use in a rotor blade in a wind power plant where the belt pair has two belts that are connected in a form-fit and/or force-fit and material fit connection and where the belts of the belt pair have the contour of the rotor blade in the area of the belt pair, and extend at least over the length of a section in the longitudinal extension of the rotor blade. In this context, the longitudinal extension corresponds to the definition given above. This typically is assumed to start from a center of the rotor blade root. However, the longitudinal extension can also have a starting point distanced from the center of the rotor blade root. A particularly stable connection of the two belts in the belt pair is possible due to the form-fit and/or a force-fit connection, which is also a material fit connection. As a result, the fabrication of corresponding rotor blades that have such a belt pair or possibly a plurality of belt pairs, is very simple.

The belts have preferably in the joining area, areas or respectively parts that overlap transverse to the longitudinal extension of the rotor blade. In the joining area, the belts are preferably designed with complimentary shapes, in particular in the form of a dovetail, with a bevel, with a tongue and groove and/or stepped.

Preferably, an overlapping element is provided that can also be designated as a belt or a belt connector, that in the joining area reaches over at least over one part of the belt transverse to the longitudinal extension, and in particular is disposed flush with the belt pair. The belts which in particular are also additionally connected to the overlapping element, have corresponding recesses into which the overlapping element fits.

As a result, the divided belt or respectively the belts of the belt pair have essentially the contour of the rotor blade in the belt pair area in which the respective belt is disposed in the rotor blade, that is, the divided belt or the belt pair is curved and twisted appropriately in the longitudinal axial direction or in the longitudinal extension, where the twisting represents in particular a type of twisting around the longitudinal axis or respectively around the longitudinal extension, and the curve is, in particular, a type of distortion of the rotor blade toward the longitudinal axis. The divided belt is thus accordingly also preferably "flexed" or "twisted".

The division of the belt, or respectively providing a belt pair is to be understood in particular that an appropriate distance is provided from the rotor blade leading edge to the rotor blade trailing edge. Alternatively, the divided belt can also be understood to be two belts disposed next to each other whose separation distance is comparatively small. Thus, the divided belt can also be two belts disposed next to each other, that are formed in particular so they bear the loading of a normally used individual belt. By using a divided belt or respectively two belts disposed next to each other, the fabrication accuracy is particularly high for rotor blades that in the longitudinal extension are composed of two parts or respectively two rotor blade sections or respectively comprise these. The belts of the belt pair according to the invention are joined together in a joining area which extends in the longitudinal extension of the belt pair corresponding to the longitudinal extension of the rotor blade.

The divided belt or respectively belt pair is preferably provided substantially over the entire longitudinal extension of the rotor blade.

A web is preferably connected, in particular bonded, to the belt parts, where the web extends from the suction side to the pressure side of the rotor blade so that the web with the belt parts forms an I-beam. This results in a particularly stable rotor blade.

The object is further solved by a method for fabricating a rotor blade of a wind power plant, where the fabricated rotor blade in its longitudinal extension that extends from a rotor blade root substantially to a rotor blade tip, has at least in one area an aerodynamic airfoil cross-section that has an airfoil leading edge (nose) and an airfoil trailing edge that are connected via a suction side and a pressure side of the airfoil cross-section, having the following method steps:

providing at least two rotor blade sections fabricated and divided in the longitudinal direction of the rotor blade, where the division is disposed between the airfoil leading edge and the airfoil trailing edge,
  applying a first belt of a belt pair in the rear area of the suction side and/or pressure side of a front rotor blade section, and applying a second belt of the belt pair in front area of the suction side and/or pressure side of the rear rotor blade section,
  connecting, in particular bonding, the first belt to the second belt in a joining area.

Within the scope of the invention, applied is understood in particular to also mean attach or insert.

The belts of the belt pair are preferably prefabricated in an arrangement according to the invention of a manufacturing mold with an intermediate web. Furthermore, two belt pairs are provided that serve for connecting the prefabricated and divided rotor blade sections in the longitudinal direction of the rotor blade. The two belts of a belt pair are appropriately disposed at the suction side of the front and rear rotor blade sections at the respective edge of the shell, and correspondingly the other two belts of the second belt pair are disposed at the pressure side also at the respective edge of the shell, so that after connecting the rotor blade sections the corresponding belt joining surfaces or joining edges can engage in each other and can be appropriately connected, in particular by bonding.

The joining surface according to the invention is also a joining edge or respectively a joining profile which is disposed in the joining area. These terms also correspondingly include the terms abutting area, contact area, abutting edge, contact edge and the like. A gap is appropriately formed by the respective belts of a belt a pair and will be filled with a bonding means, in particularly adhesive.

The method preferably has the following methods steps:
  applying or inserting a first web part, extending substantially from the pressure side to the suction side, into a first divided rotor blade section, and applying or inserting a second web part, extending substantially from the pressure side to the suction side, into a second divided rotor blade section, and
  connecting, in particular bonding, the first web part to the second web part so that a double web is formed.

By producing a double web, the stability of the web is already increased. The applying or inserting of a first web part extending substantially from the pressure side to the suction side into a first divided rotor blade section, and applying or inserting of a second web part extending substantially from the pressure side to the suction side into a second divided rotor blade section, includes applying or inserting the respective web parts into the interior of the rotor blade sections so that these are attached to the inner wall of the rotor blade section or of a belt disposed there. Applying or inserting is also understood to mean attaching.

Applying or inserting the first and the second web parts preferably comprises connecting, in particular adhering, the first and second web part in each case to a belt at the pressure side and a belt at the suction side of each rotor blade section.

The bonding, in particular adhering, of the first web part, forming in particular a rectangular bracket, to the second web part, forming in particular a rectangular bracket, preferably forms an I-beam comprising at least four belts and one double web. As a result of this, it is particularly easy to connect the two rotor blade sections together, resulting in a very stable structure.

Preferably, the method for fabricating a rotor blade of a wind power plant is further developed by the following method steps:
  applying or inserting a web, which extends substantially from the pressure side to the suction side and that has at least two web feet, into a first divided rotor blade section so that a part of the web feet extends beyond the rotor blade section,
  connecting, in particular bonding, the extending part of the web feet to a second divided rotor blade section.

Connecting, in particular bonding, the web to the rotor blade sections preferably forms an I-beam comprising four belts and the web. The term applying or inserting can also be understood to mean attaching.

With the production of a rotor blade, a rotor blade tip area and/or a rotor blade root can preferably be provided as a pre-fabricated insert part that in each case does not necessarily have to be divided in the longitudinal extension. The longitudinal extension of this pre-fabricated insert part can extend from a few centimeters to up to 5 m.

For providing two prefabricated rotor blade sections divided in the longitudinal extension of the rotor blade, preferably in at least one rotor blade section, a suction side section and a pressure side section are connected together, in particular bonded.

The two rotor blade sections preferably form a nose box and/or an end box of the rotor blade.

For providing two prefabricated rotor blade sections divided in the longitudinal extension of the rotor blade, preferably a belt is connected, in particular bonded, in each case to a suction side and a pressure side of each rotor blade section.

The method according to the invention and the further developments of the method according to the invention are preferably performed in a joining apparatus provided for this purpose that is formed with appropriate holding apparatus to hold the rotor blade sections or suction side sections and pressure side session sections as well as webs and the like. Alternatively, these components can also be disposed or held, at least to some extent, in a manufacturing mold. An appropriate manufacturing mold is disclosed in the German patent application, DE 10 2008 038 620.0, cited above.

In the joining area, the surfaces bordering each other of the belts of a belt pair, which can also be designated in particular as abutting edges, abutting surfaces or joining surfaces or joining edges, have complementary shapes. The connection is a direct connection, in particular bonding, so that surfaces disposed together such as the joining surfaces of the belts have only a bonding medium disposed between them, in particular an adhesive.

Using a method for producing a belt pair of a rotor blade of a wind power plant, in particular for producing a rotor blade according to the invention where the belt pair is produced in a manufacturing mold which has a contour of a rotor blade in the area of the belt pair and which extends at least over the length of a section of the rotor blade, in particular in the longitudinal extension, it is possible to produce a belt pair in a very precise manner for use in a rotor blade, where the belt pair is disposed on the suction side and/or on the pressure side of the rotor blade, and serves in particular for the purpose of connecting shell segments or respectively rotor blade sections or suction side sections and pressure side sections to the belt pair so that it is possible to very precisely fabricate a rotor blade fabricated this way. By maintaining a preferably constant separation distance between the belt pair over the length of the section, in particular the aerodynamic section, of the rotor blade, and preferably from the blade root to the blade tip, or substantially from the blade root to substantially the blade tip, a very high joining accuracy or respectively connection accuracy can result.

Preferably, the section extends from an area in the proximity of the rotor blade root up to the rotor blade tip or up to a section end of the rotor blade in the proximity of the rotor blade tip. With this, particularly with the last variant having the extension up to a section end of the rotor blade in the proximity of the rotor blade tip, a fabrication is provided in which a prefabricated rotor blade tip is attached to a longitudinally extended, divided rotor blade section. For this purpose then the belt pair is adapted according to the section length of the divided rotor blade sections, specifically in the longitudinal extension of the rotor blade sections. The pre-fabricated rotor blade tip section or respectively the pre-fabricated rotor blade tip can have a length of a few centimeters up to several meters, in particular up to 5 m.

Preferably an intermediate web, particularly a center web, is provided in the manufacturing mold that is designed either integrally with the manufacturing mold as an intermediate web, in particular center web, or is designed as a removable intermediate web, in particular center web. As a result, a very exact constant separation distance can be attained between the belt pairs. In the context of the invention, the term "belt pair" can also include two belts that are produced next to each other in a manufacturing mold, or also the term "belt divided in the longitudinal direction or respectively longitudinal extension of the rotor blade".

Preferably, the belts of a belt pair have recesses in which an overlapping element can be bonded. Furthermore, a web is preferably bonded in between a belt on the suction side of the rotor blade and a belt on the pressure side of the rotor blade.

In addition, the object is solved by an arrangement of a manufacturing mold for producing a belt pair for use in a rotor blade with an intermediate web, that is further developed in that the manufacturing mold has the contour of the rotor blade in the area of the belt pair on the suction side or the pressure side of the rotor blade, and extends at least over the length of a section in the longitudinal extension of the rotor blade, where the intermediate web is provided to separate the belts during the fabrication and to define a larger joining surface of the belts to each other compared to an intermediate web disposed only perpendicular to the contour.

A groove is preferably provided in the manufacturing mold for receiving the intermediate web. Preferably the intermediate web has an extension that provides for an overlapping of a part of the belt transverse to the longitudinal extension of the manufacturing mold for the fabricated belts. Preferably the intermediate web creates a dovetail, a bevel, a groove, a tongue and/or a step in the manufactured belts, where the produced or respectively created geometric shapes of adjacent belts of a belt pair are complementary. Complementary shapes is understood also to be a shape of the parts or respectively belts that belong together, that have a gap disposed between them which is filled or can be filled appropriately with a bonding means, or respectively instance an adhesive.

BRIEF DESCRIPTION OF THE DRAWINGS

The invention is described below based on embodiments without restricting the general idea of the invention; explicit reference is made to the figures with regard to all inventive particulars not explained in more detail in the text. They show.

DETAILED DESCRIPTION OF THE INVENTION

In the following figures, the same or similar types of elements or corresponding parts are provided with the same reference numbers so that a corresponding re-introduction can be omitted.

Figure 1:
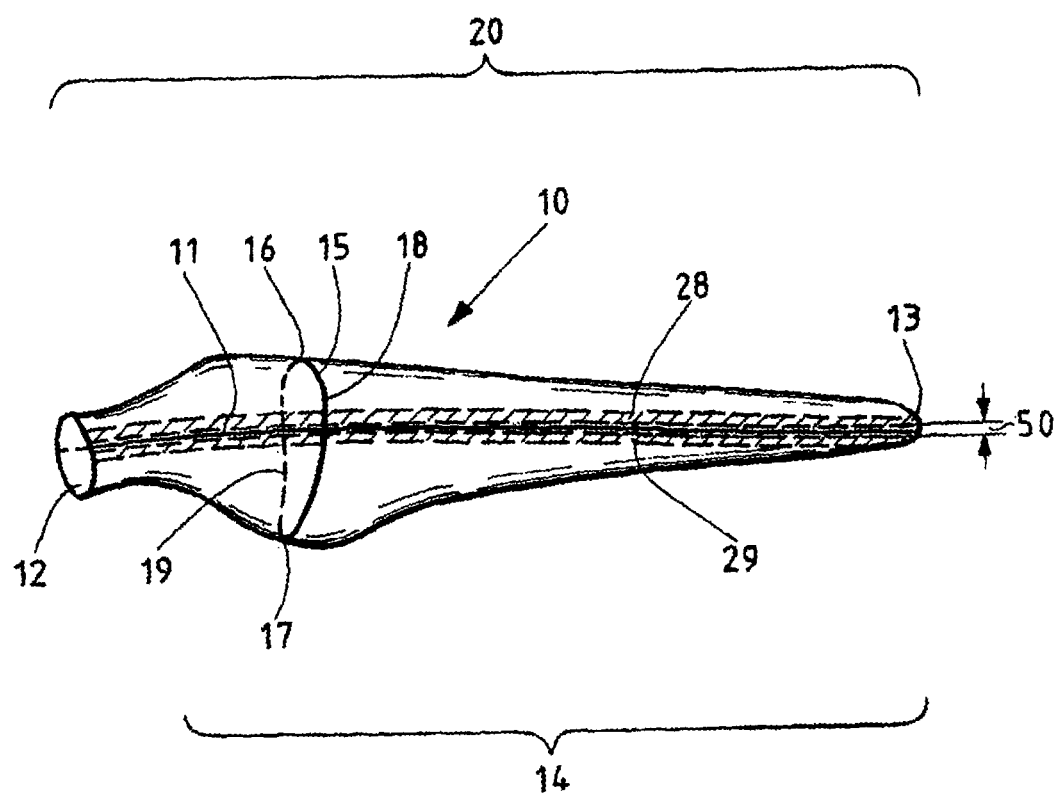
FIG. 1 a schematic representation of a rotor blade according to the invention of a wind power plant, FIG. 2 a schematic representation of a further rotor blade according to the invention of a wind power plant, FIG. 3 a schematic representation of a section of corresponding components of a rotor blade in corresponding joining devices in a progressed stage of the fabrication of the rotor blade, FIG. 4 a schematic representation of a section through a fabricated belt pair in a rotor blade, FIG. 5 a schematic representation of a section through a fabricated belt pair in a rotor blade, FIG. 6 a schematic representation of a section through a fabricated belt pair in a rotor blade, FIG. 7 a schematic representation of a section through a fabricated belt pair in a rotor blade, FIG. 8 a schematic representation of a section through a fabricated belt pair in a rotor blade, FIG. 9 a schematic representation of a section through a fabricated belt pair in a rotor blade, FIG. 10 a schematic representation of a section through a fabricated belt pair in a rotor blade, FIG. 11 a schematic representation of a section of a rotor blade according to the invention, FIG. 12 a schematic representation of a section of the arrangement according to the invention of a manufacturing mold for the production of a belt pair with an intermediate web, and FIG. 13 a further schematic representation of a section of an arrangement according to the invention of a production mold for the production of a belt pair with an intermediate web.

FIG. 1 schematically shows a rotor blade 10 according to the invention that has a longitudinal extension 11 from a rotor blade root 12 to a rotor blade tip 13. An airfoil cross section 15 is represented in the rotor blade 10 that is aerodynamically active and has a suction side 18 and a pressure side 19. The aerodynamic airfoil cross section 15 further has an airfoil leading edge 16 (nose) and an airfoil trailing edge 17.

Further, a belt pair is represented schematically that is composed of the belts 28 and 29. A joining area 50 is provided. The belts 28 and 29 are disposed on the suction side 18. The belts 28 and 29 are provided in the section 20, that is, in this example embodiment of FIG. 1, from the blade root 12 up to the rotor blade tip 13. A corresponding belt pair composed of the belts 30 and 31 on the pressure side 19 of the rotor blade 10 is not shown. An aerodynamic area 14 of the rotor blade 10 that mainly ensures the lift, is also indicated. The section 20 can also be correspondingly shorter, for example ending at a presettable first separation distance to the rotor blade tip 13 and/or at a presettable second separation distance to the rotor blade root 12. The rotor blade 10 can be divided during production in the area of the longitudinal extension 11 represented in FIG. 1. It can be further divided also at the airfoil leading edge 16 and the airfoil trailing edge 17.

Figure 2:
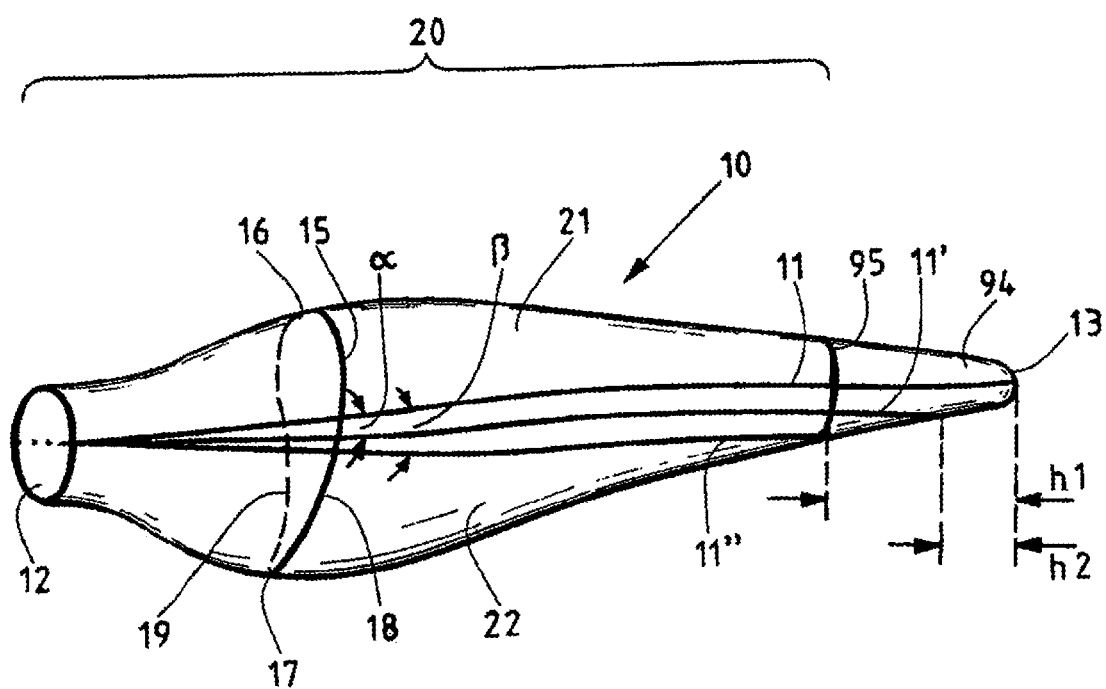

FIG. 2 shows a schematic representation of a rotor blade 10 according to the invention. In this rotor blade, a longitudinal division of the rotor blade 10 is provided into rotor blade sections 21 and 22, where the division occurs along a longitudinal extension 11, or 11' or 11". The longitudinal extension 11 goes from a rotor blade root to the rotor blade tip 13. The longitudinal extension 11' runs from the rotor blade root substantially to the rotor blade tip 13, and ends in the area of the rotor blade tip 13 at a separation distance h2 from this tip. Correspondingly, a division in the longitudinal extension 11" extends up to an edge in the area of the rotor blade tip 13, which represents a connecting edge 95 between a pre-fabricated rotor blade tip and the remainder of the rotor blade or rotor blade section 20. In this case, the rotor blade tip need not necessarily be divided in the longitudinal extension, for example.

The separation distance to connecting edge 95 is indicated by h1. This can amount to up to 5 m. However, the separation distance can also be a few centimeters. As stated, the rotor blade tip section 94 can be pre-fabricated. Correspondingly, between the longitudinal extension 11 between the rotor blade root 12 and a rotor blade tip 13, angles, α and β, are provided to the longitudinal extension 11' or respectively longitudinal extension 11". α can lie in the range of 0.1 to 2°, and β can lie in the range of 2° to 5°.

Figure 3:
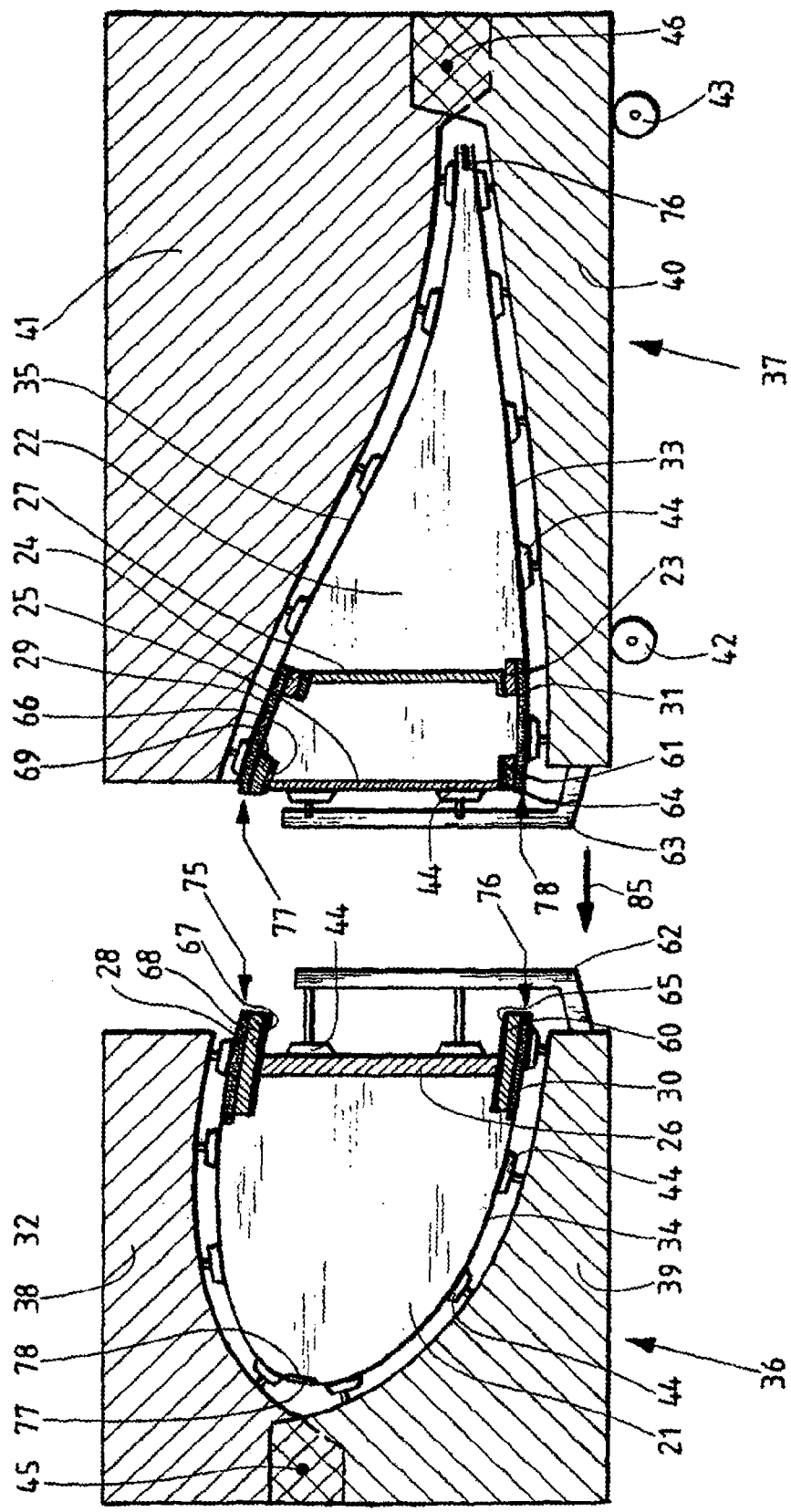

FIG. 3 shows an apparatus for fabricating a rotor blade 10, where two joining devices 36 and 37 are provided on which the shell segments 32, 33, 34, 35 of the rotor blade 10 are held. The shell segment 32 corresponds to a rotor blade shell on the pressure side 19 belonging to a leading edge box or a nose box 21, and the shell segment 34 belongs to the suction side 18 of the leading edge box or the nose box 21. Corresponding belts 28 and 30 are connected to, in particular bonded, to the shell segments 32 and 34. The bonding can be implemented using a resin, for example. The shell segments 32 and 34 are fixed in the joining device 36 by means of several suction elements 44 using suction air. Correspondingly, the shell segments 33 and 35 are fixed in the joining device 37 by suction elements 44 using suction air.

The shell segment 33 can belong to the suction side of an end box 23, and the shell segment 35 can belong to the pressure side of an end box 22. The shell segments 32 to 35 can be produced, for example, from a glass fiber reinforced fabric using a resin, for example an epoxy resin. The rotor blade parts are preferably produced using a plastic technology. Preferably, the plastic technology uses at least one resin and at least one fiber layer, in particular a glass fiber and/or carbon fiber and/or aramid, in particular Kevlar fibers for example. A resin transfer molding (RTM) technique or a resin infusion molding (RIM) technique can be used for production of the rotor blade shell segments 32-35, in particular a vacuum-assisted resin (VAR) infusion technique and/or a laminating technique, for example with so-called prepregs. In FIG. 3, the fabrication of the rotor blade segments 32-35 has already occurred previously, so that the fabricated shell segments are applied or placed in the joining devices 36 and 37.

Also, the belts 28-31 applied on, or connected to, or bonded to, the shell segments, can already have been connected to the shell segments in the fabrication in a manufacturing mold.

The joining devices 36 and 37 each have pivot axes 45 and 46 about which the pivot parts 38-41 can be pivoted.

FIG. 3 shows a progressed stage of the fabrication of the rotor blade according to the invention. A web part 26 is fixed by using suction elements 44 attached precisely at the second pivot part 39, or at this aligned positioning device 62. The web part 26 has a web foot 65 toward the suction side 18, and a web foot 67 toward the pressure side 19. The web foot 65 is bonded to the belt 30 using an adhesion 60, for example composed of a resin. Correspondingly, a positioning device 63 is bonded to the third pivot part 40, or aligned at this. A web part 25 is fixed to the positioning device 63 using suction elements 44. The web part 25 has web feet 64 and 66. The web foot 65 is connected to the belt 31 by using a bonding 61. Here too, it is possible to have an exact alignment of the web parts 27 to the belt 31 and to the shell segment 33.

A web 27 was already previously bonded between the belts 29 and 31, specifically using the bonding 23 and 24 to the web feet, which do not have reference numbers here. In addition, the pivot part 41 was already correspondingly pivoted about the pivot axis 46. Correspondingly then, as already shown in FIG. 3, the first pivot part 38 was pivoted about the pivot axis 45, so that a bonding 68 of the web foot 67 to the belt 28 was performed. Here too, an exact fit is possible. In addition, there is a bonding 77 of the shell segment 32 to the shell segment 34 using a bonding part 78 bonded to the shell segment 34 in the nose area of the nose box 21.

For producing an end box 22, the fourth pivot part 41 was pivoted about the pivot axis 46, and also the web foot 66 was bonded to the belt 29 in a bonding 69, so that an exact bonding occurred between the web 27 and the belt 29, or the shell segment 35. The rear edge of the rotor blade is also correspondingly connected using a bonding 76.

Joining devices 36 and 37 preferably have, in addition to the pivot axes 45 and 46, a linear adjustment device, not shown, with which the mold parts 38 and 39 or 40 and 41, thus the corresponding pivot parts 38 to 41, can be closed in a straight line movement.

Next, as shown by the arrow 85, joining device 37 travels using the wheels 42 and 43 provided on it, in the direction of the joining device 36, specifically after a binding of the bonds 60, 68, 77, 61, 69, and 76, and after a removal of the positioning devices 62 and 63.

Both rotor blade sections are bonded together at the joining surfaces in the form of the nose box 21 and the end box 22, so that a direct bonding of the belts 28 to 31 is performed. The bonding media can be an infusion resin or a low viscosity adhesive resin. In addition, a glass fiber mesh can be also be inserted. The remaining gap that results from the bonding medium between the belts 28 to 31 and the corresponding shells 32 to 35 of the rotor blade, and also from to the thickness of the shell segments, can also be tightly closed appropriately by using the adhesive medium, for example resin, or possibly supplemented using a glass fiber mesh.

The arrangement of the rotor blade 10 or the rotor blade shell segments 32-35 with the suction side elements downward is not mandatory. These can also be positioned differently.

In order to attain a buckling strength of the produced rotor blade 10, the blade can also have a trailing edge web. The trailing edge web is preferably disposed in the end box 22, and can be positioned there on the suction side and/or the pressure side, and in the case of a 61 m blade, can extend up to approximately 8 m to 52 m from a rotor blade root 12.

The joining device 36, 37 is preferably used because this reduces the mold occupancy time. The four shell segments 32 to 35 are aligned appropriately in pivot parts 38 to 41. The bonding of the web parts 26 and 27 occurs in particular in a flat surface. The particularly precise positioning and alignment of the shell segments 32 to 35 and the webs 25, 26 and 27 occur preferably using the positioning device, indicated in FIG. 3, which is represented as the suction elements 44, and which can preferably be adjusted in their height or separation distance to the pivot parts. A very exact shape is attained because the belts or belt parts 28, 29, and 30, 31 together, that is, the belts 28 and 29 together, and the belts 30 and 31 together are manufactured in a manufacturing mold. For this purpose, appropriate manufacturing molds are shown schematically in sectional representation in FIGS. 12 and 13, in which the corresponding belts 28 and 29, represented here as an example, are fabricated.

Figure 5:
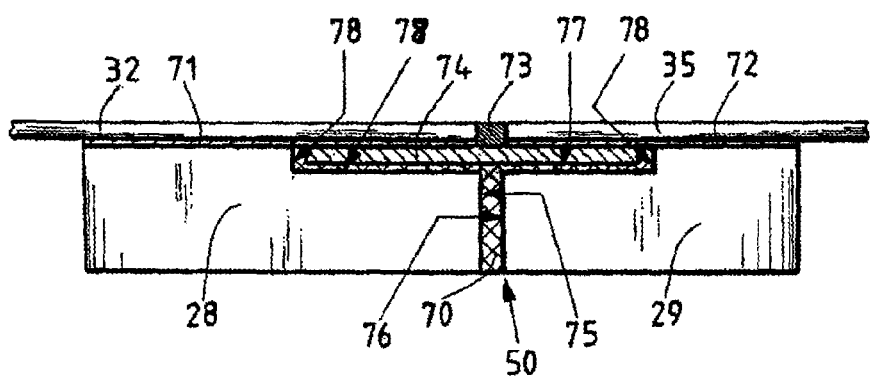

In the manufacturing molds 54 and 55, two cavities each are provided for the belts 28 and 29 to be produced, that are separated in the center. In the example embodiment according to FIG. 12, the separation occurs using a center web 56 that can be inserted into a recess 58, and in the embodiment design according to FIG. 13, a further cavity is additionally provided which is bordered by webs 59 and 59', and a corresponding intermediate web 57. In these example embodiments, not only are two belts 28 and 29 fabricated that have corresponding recesses, but also a belt connector 74 that, as represented in FIG. 5, provides additional retaining forces with the connection of the belts 28 and 29. According to the invention an appropriate arrangement of the manufacturing mold 54 or 55 is provided with an intermediate web 56 or 57, where the intermediate web 56 or 57 has a shape according to the invention.

During production of the belts 28 and 29, dry glass fibers are placed in the mold and are soaked with a resin due to an injection of resin through the resin injection connections 83, 84 and 86 into the cavities. Due to the form-retaining separation, or the fabrication of the two belts 28 and 29 in a single mold, the two belts 28 and 29 always match each other perfectly. The two belts have an identical curvature and twist which corresponds to the fabricated rotor blade 10 in the area of the respective belt. The fabrication of the belts 28 and 29 in the embodiment examples according to FIG. 12 and FIG. 13 preferably occurs using a vacuum-supported infusion technique for which resin injection connections 83 and 84 and vacuum connections 81 and 82 are provided. For sealing, a vacuum film 80 is provided that is connected to the manufacturing molds 54 or 55 with sealing bars on the left and right in the FIGS. 12 and 13, without reference numbers, that can be designed, for example, as rubber lips.

Figure 12:
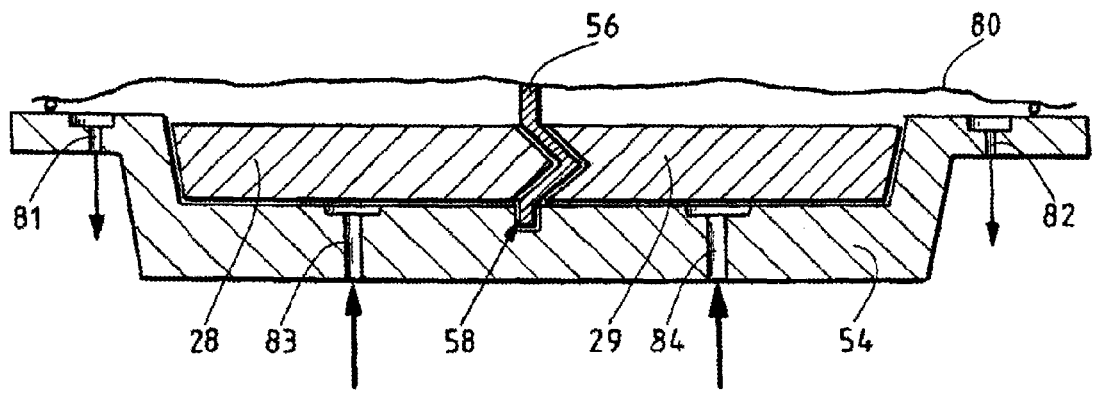
Figure 13:
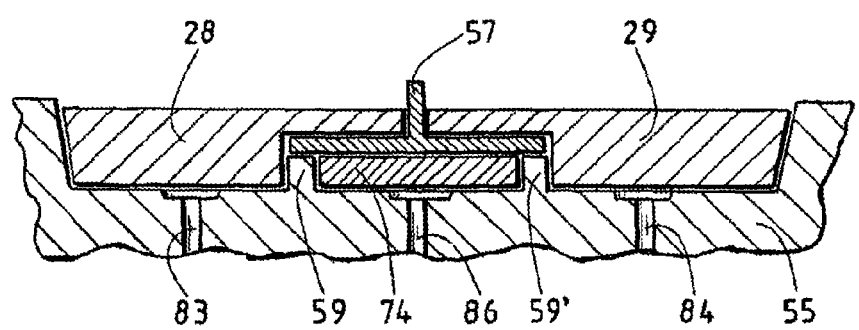

In the embodiment design according to FIGS. 12 and 13, both belts 28, 29 are demolded together from the manufacturing mold 54 or 55, and then removed from the intermediate web. As a result, smaller alignment errors can occur in the intermediate web that are, however, irrelevant because the two belt halves are always formed complementary, thus essentially having the same shape.

In FIG. 13, the belt connector 74 is fabricated at the same time as the belts 28 and 29, so that it also has a shape complimentary to the belt halves or the belts 28 and 29, and thus at every position of the section of the rotor blade fits to the belts 28 and 29 in the recesses.

The common production of the two belts in one manufacturing mold saves production space and time during the fabrication. Furthermore, belts produced in this manner that are used in the longitudinal extension of the rotor blade at a pressure side or a suction side, can also be used instead of a web that connects the belts and that is bonded in the center, thus a double web, for example with a bonding using a box spar according to the patent application DE 10 2008 038 620.0.

Using the invention, it is possible to produce a web-to-shell-bonding that can be monitored, is process-reliable and accessible. Large forces can be transferred through a large area bonding of the center web or the web, by means of which an I-beam is formed. Furthermore, it is not necessary to use an external pressing force for displacing the adhesive, because the web parts 26 and 27 are pressed against each other by the applied vacuum. The web parts can bear tensile force, however they are relatively soft by themselves. Local differences in the thickness of the adhesive gap, that is of the gap between the web parts 26 and 27, which arise due to tolerances of the bonding surfaces or respectively the web surfaces are leveled out due to the vacuum on the thickness of the flow media. The flow media also ensures the flow of resin through the surfaces that are pressed together. This is not visible in the fabricated blade.

FIGS. 4 to 10 show different embodiments of the connection of two belts 28 and 29 of a belt pair. The embodiments differ by different designs of the joining surfaces or respectively abutting surfaces. The belts 28 and 29 are appropriately attached to the shell segments 32 and 35 using a bonding 71 or 72. In the joining area 50, a bonding occurs between the abutting edges or respectively joining edges 75 and 76 of the belts 28 and 29. In addition, there is also a bonding 73 above the belt in the area of the shell segments 32 and 35. The bonding can be a resin injection that can also be provided with a fiber mesh. In the scope of the description for the FIGS. 4 to 10, only the connections of the belts 28 and 29 are represented on one side of the rotor blades. However, the embodiments are also intended for the other belts 30 and 31.

Figure 4:
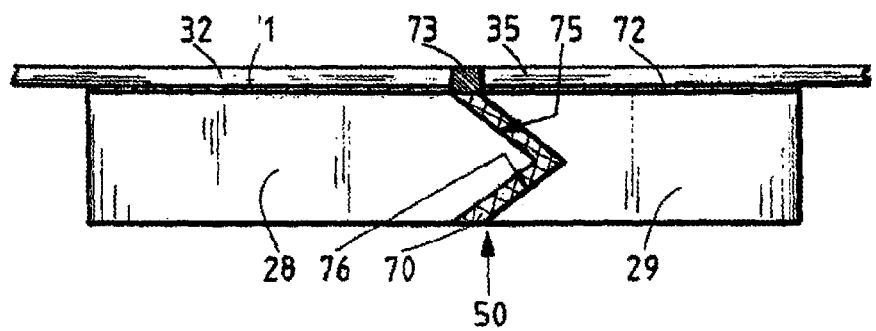
Figure 6:
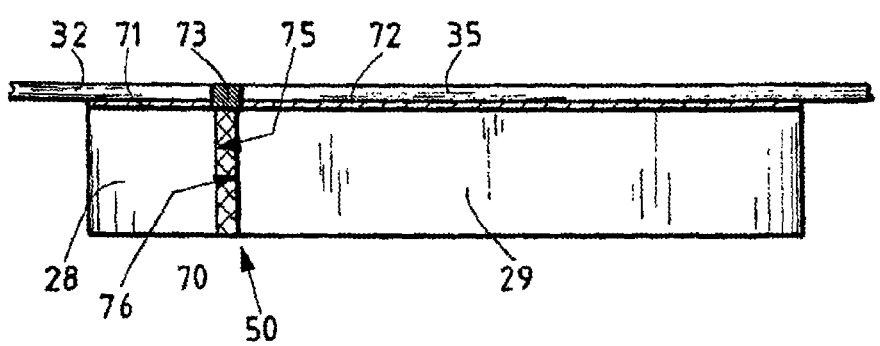
Figure 7:
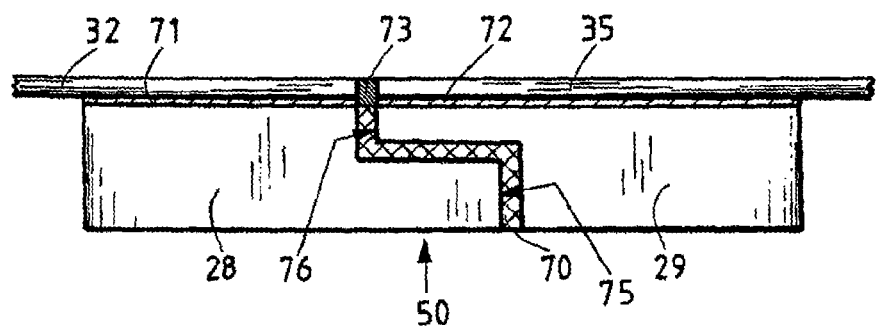

FIG. 4 schematically represents a dovetail connection. By using a dovetail connection, a larger joining surface is obtained than in the case of a connection with a surface as shown in FIG. 6 for instance. This leads to a connection with increased stability.

FIG. 5 shows an embodiment in which there is a recess in the belts 28 and 29 into which a belt connector 74 is inserted. Correspondingly, the belt connector 74 is disposed in the joining area and connects the belts 28 and 29 as well as the corresponding abutting edges 75, 76 and 77 and 78.

FIG. 6 shows a further embodiment of an appropriate connection of belts 28 and 29, where this example embodiment provides a relatively broad belt 29 and a relatively narrow belt 28. This embodiment is used, for example, when a relatively small nose segment is to be applied at a relatively large end box. In this case, the forces which act on the connection location, or the joining area 50, are not as strong as in the case of a division of the rotor blade into approximately equally sized sections.

FIG. 7 again shows an enlargement of the joining surfaces 75 and 76, which are given by a type of tongue and groove connection, or a partial tongue and groove connection. A complete tongue and groove connection could also be given, in that an intermediate part of a belt 28 is inserted, for example, completely into a recess of the belt 29, which is not shown in the figures.

Figure 8:
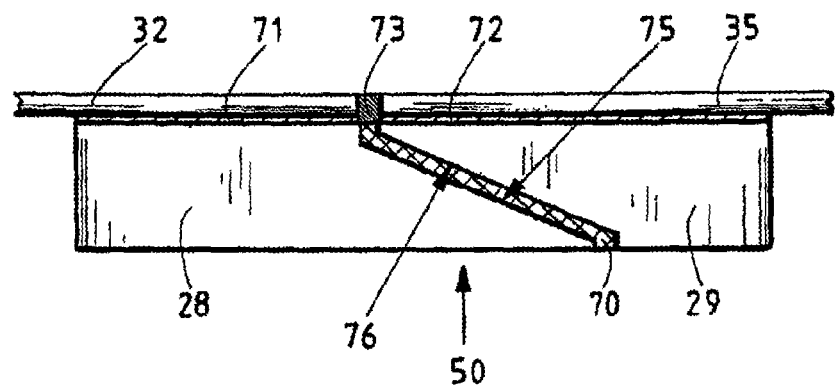
Figure 9:
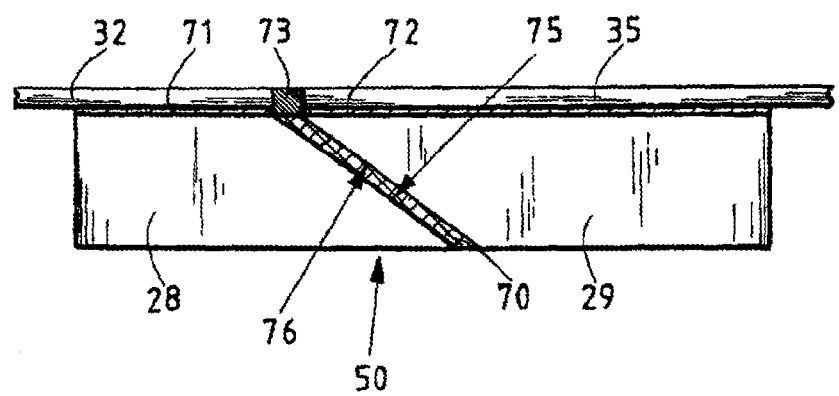

In FIGS. 8 and 9, the joining area 50 of the joining surfaces are beveled. According to FIG. 8, the joining surfaces 75 and 76 are also angled, and according to FIG. 9, they are composed exclusively of a bevel at a predetermined angle.

Figure 10:
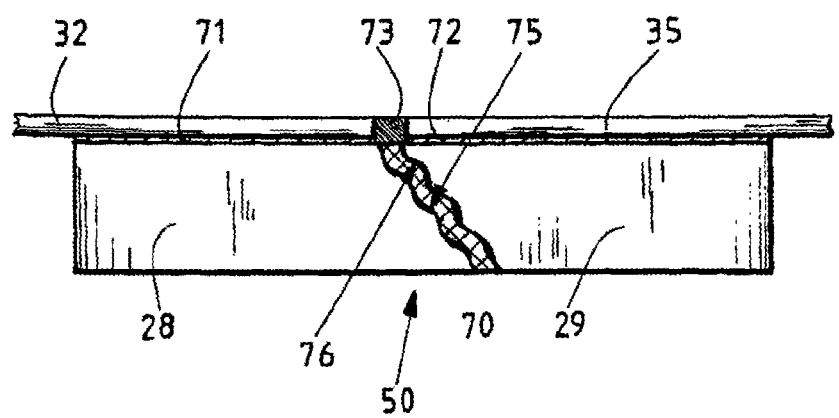

In FIG. 10 the joining surfaces 75 and 76 are irregular and curved, where the shape of the surfaces are correspondingly complementary to each other.

Figure 11:
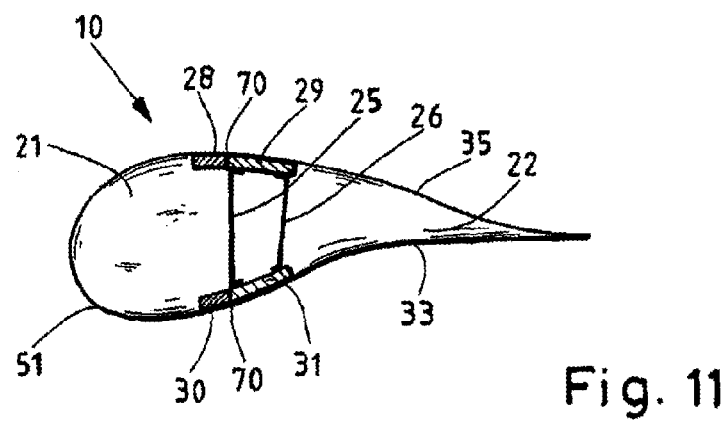

FIG. 11 schematically shows another example embodiment, in which the end box of a rotor blade 10, shown in section, is formed by two webs 25 and 26, which are bonded to the belts 29 and 31. In this respect, it forms a beam box. The nose box 21 should be relatively small so that no web is required between the small, narrower belts 28 and 30.

All named features, including those taken from the drawings alone, and individual features, which are disclosed in combination with other features, are considered individually and in combination as essential to the invention. Embodiments according to the invention can be fulfilled through individual characteristics or a combination of several characteristics.

LIST OF REFERENCE SYMBOLS

10 rotor blade
11, 11', 11" longitudinal extension
12 rotor blade root
13 rotor blade tip
14 aerodynamic area
15 airfoil cross section
16 airfoil leading edge
17 airfoil trailing edge
18 suction side
19 pressure side
20 section
21 nose box
22 end box
23 bonding
24 bonding
25 web
26 web
27 web
28 belt
29 belt
30 belt
31 belt
32 shell segment
33 shell segment
34 shell segment
35 shell segment
36 joining device
37 joining device
38 first pivot part
39 second pivot part
40 third pivot part
41 fourth pivot part
42 wheel
43 wheel
44 suction element
45 pivot axis
46 pivot axis
47 double web
50 joining area
51 nose segment
54 manufacturing mold
55 manufacturing mold
56 center web
57 intermediate web
58 recess
59, 59' web
60 bonding
61 bonding
62 positioning device
63 positioning device
64-67 web foot
68 bonding
69 bonding
70 bonding
71 bonding
72 bonding
73 bonding
74 belt connector
75 joining surface
76 joining surface
77 joining surface
78 joining surface
80 vacuum film
81 vacuum connection
82 vacuum connection
83 resin injection connection
84 resin injection connection
85 arrow
86 resin injection connection
94 rotor blade tip section
95 connection edge
h1 separation distance
h2 separation distance
α angle
β angle

The invention claimed is:

1. A rotor blade of a wind power plant, comprising:
a longitudinal extension that extends substantially from a rotor blade root to a rotor blade tip of the rotor blade; and
an aerodynamic airfoil cross section provided in least one area of the rotor blade that has an airfoil leading edge and an airfoil trailing edge which are connected together via a suction side and a pressure side of the airfoil cross section,
wherein in the longitudinally extended section, the rotor blade is divided into a front rotor blade section with the airfoil leading edge and a rear rotor blade section with the airfoil trailing edge,
wherein a rear area of the front rotor blade section and an adjacent front area of the rear rotor blade section are connected by a plurality of belts in a joining area that runs in the longitudinal extension of the rotor blade, the plurality of belts being connected by at least one of a form-fit and material fit connection, and a force-fit and material fit connection, wherein the plurality of belts includes two belts at the suction side and two other belts at the pressure side of the rotor blade, and wherein the plurality of belts have areas in the joining area that are only partially overlapping with one another transverse to the longitudinal extension of the rotor blade.

2. The rotor blade according to claim 1, wherein at least one web connects together respectively the two belts from the pressure side to the suction side.

3. The rotor blade according to claim 1, wherein the plurality of belts in the joining area have complementary shapes, the complementary shapes including at least one of a dovetail shape, a beveled shape, a tongue and groove shape, and a stepped shape.

4. The rotor blade according to claim 1, wherein an overlapping element in the joining area reaches transverse to the longitudinal extension at least over a part of the belts.

5. The rotor blade according to claim 4, wherein the overlapping element is disposed flush with a surface of the joined belts or with an outer shell of the rotor blade, and wherein the surface is disposed transverse to the joining surface of the belts and transverse to the longitudinal extension.

6. The rotor blade according to claim 1, wherein one of the two belts is connected to the front rotor blade section, and the other of the two belts is connected to the rear rotor blade section.

* * * * *